United States Patent [19]

Itoh et al.

[11] Patent Number: 4,486,838
[45] Date of Patent: Dec. 4, 1984

[54] APPARATUS AND METHOD FOR ELECTRONIC CONTROL OF AUTOMATIC TRANSMISSION AVOIDING OVER-QUICK DOUBLE GEAR CHANGING

[75] Inventors: Hiroshi Itoh; Motoki Endo, both of Toyota, Japan

[73] Assignee: Toyota Jidosha Kabushiki Kaisha, Aichi, Japan

[21] Appl. No.: 341,270

[22] Filed: Jan. 21, 1982

[30] Foreign Application Priority Data

Mar. 4, 1981 [JP] Japan .................... 56-31729

[51] Int. Cl.³ .................. G05D 17/02; B60K 41/08
[52] U.S. Cl. ................... 364/424.1; 74/866
[58] Field of Search .............. 364/424.1; 74/866

[56] References Cited

U.S. PATENT DOCUMENTS

| | | | |
|---|---|---|---|
| 4,034,627 | 7/1977 | Mizote | 74/866 |
| 4,314,340 | 2/1982 | Miki et al. | 364/424.1 |
| 4,338,666 | 7/1982 | Suzuki et al. | 364/424.1 |
| 4,338,832 | 7/1982 | Pelligrino | 74/866 |
| 4,412,290 | 10/1983 | Pannier | 364/424.1 |
| 4,417,307 | 11/1983 | Kubo et al. | 364/424.1 |

*Primary Examiner*—Felix D. Gruber
*Attorney, Agent, or Firm*—Stevens, Davis, Miller & Mosher

[57] ABSTRACT

A transmission control device, for a road vehicle with an engine and a transmission which has a gearbox which includes several fluid pressure activated friction engaging mechanisms and which can provide at least three forward speed stages according to selective supplying of actuating pressures to the friction engaging mechanisms, practices a transmission control method. An electrically actuated hydraulic pressure control device selectively supplies actuating pressures to the friction engaging mechanisms so as to engage any one of the forward speed stages i.e. gear ratios. An electronic control system repeatedly at short time intervals receives from a road speed sensor and an engine load sensor signals representative of road speed and of engine load, then determines a target speed stage, then determines a decided speed stage, and then energizes the hydraulic pressure control device to engage the decided speed stage. The decided speed stage is determined so as to cause, when the actual speed stage and the target speed stage differ by less than two speed stages, immediate shifting of the gearbox to the target speed stage; and is also determined so as to cause, when the actual speed stage and the target speed stage differ by two or more speed stages, at least sometimes shifting of the gearbox by steps of one speed stage at a time to the target speed stage, the shifts by steps being separated in time by at least a predetermined first time interval.

30 Claims, 8 Drawing Figures

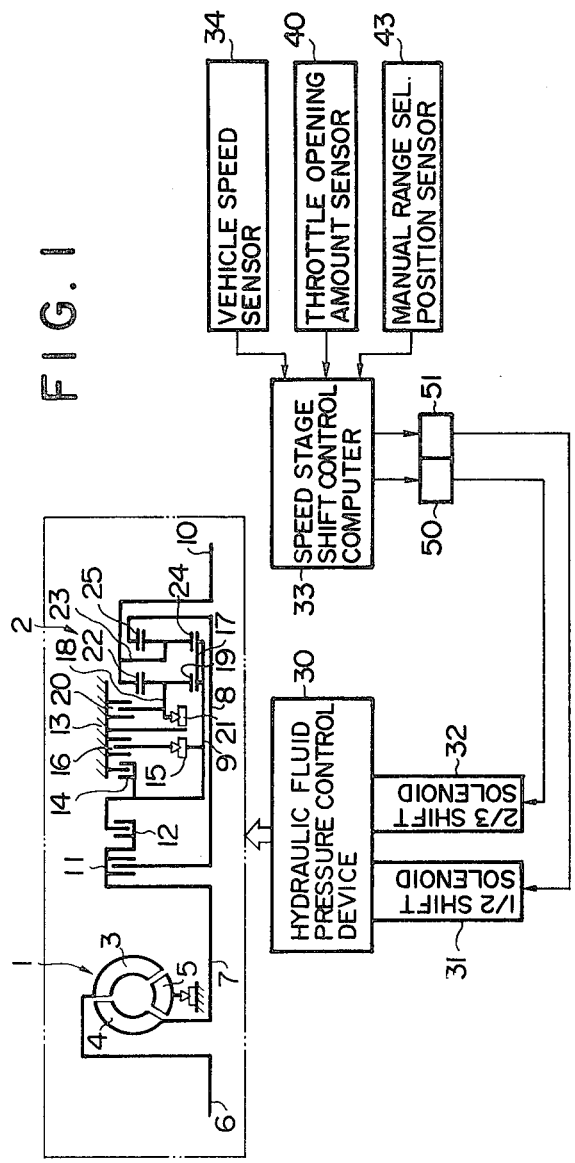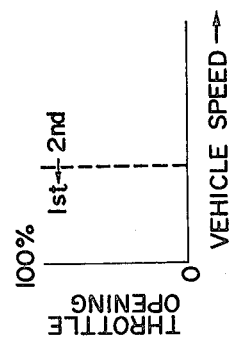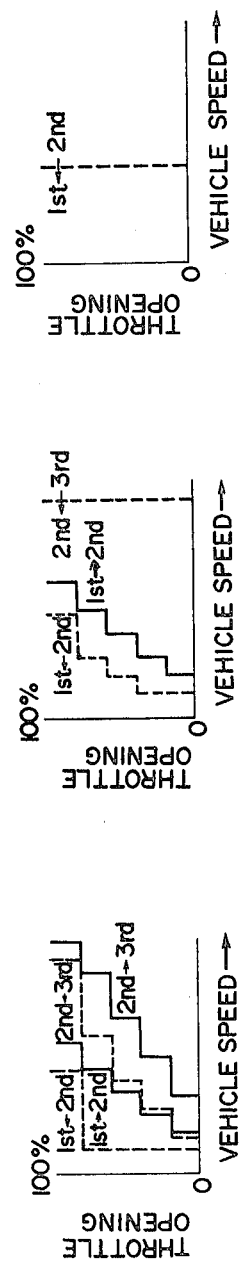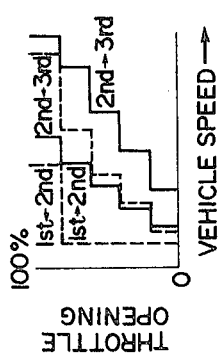

APPARATUS AND METHOD FOR ELECTRONIC CONTROL OF AUTOMATIC TRANSMISSION AVOIDING OVER-QUICK DOUBLE GEAR CHANGING

BACKGROUND OF THE INVENTION

The present invention relates to a transmission control device, and to a method of transmission control implemented by said transmission control device, for an automatic transmission system for an automotive vehicle such as one for road use, and, more particularly, relates to such a transmission control device and method for an automatic transmission system incorporating a gear transmission mechanism which includes a plurality of hydraulic fluid pressure activated friction engaging mechanisms, in which an electrically actuated and controlled hydraulic fluid pressure control device selectively supplies actuating pressures to the friction engaging mechanisms of the gear transmission mechanism of the automatic transmission, so as to control the transmission between its various speed stages, i.e., gear ratios, according to selective supply of actuating electrical energy to said electrically controlled hydraulic fluid pressure control device.

Automatic transmissions for automotive vehicles which include gear transmission mechanisms including several fluid pressure activated friction engaging mechanisms such as multi plate clutches and multi plate brakes are well known in various forms. Such an automatic transmission is often conventionally controlled by a hydraulic fluid pressure control systems, which selectively controls supply of hydraulic fluid pressure to the friction engaging mechanisms, according to decisions that said hydraulic fluid pressure control system makes as to what speed stage of the gear transmission mechanism should be currently engaged, in view of and based upon the current values of various operational parameters of the vehicle, such as the road speed of the vehicle, the load upon an internal combustion engine of the vehicle, and the like.

Nowadays, however, with the rapid progress which is being attained in the field of electronic control systems, various arrangements have been proposed, in which electronic control devices make control decisions as to what speed stage of the gear transmission mechanism should be currently engaged, in view of and based upon the current values of various operational parameters of the vehicle, such as the road speed of the vehicle, the load upon an internal combustion engine of the vehicle, the currently selected transmission range, and the like. In such arrangements, an electric signal is sent by such an electronic control device to an electric to hydraulic pressure conversion device such as a solenoid valve, and this electric to hydraulic pressure conversion device is incorporated in a hydraulic fluid pressure control system which performs the actual switching of the aforesaid activating hydraulic fluid pressures to the friction engaging mechanisms. Thus the hydraulic fluid pressure control system does not actually make the decision, itself, as to which speed stage should be engaged, but instead merely follows and implements the decision made by said electronic control device.

Further, as a particular mode of operation, it is known for such an electronic control device to read a target speed stage for the automatic transmission out from a memory means such as a read only memory or ROM, according to the current values of various operational parameters of the vehicle, such as the road speed of the vehicle, the load upon the internal combustion engine of the vehicle, the currently selected transmission range, the current speed stage which is being provided by the gear transmission mechanism, etc., and then to send such an electric signal to the hydraulic fluid pressure control system as to cause said hydraulic fluid pressure control system to so switch the supply of actuating hydraulic fluid pressures to said friction engaging mechanisms of said gear transmission mechanism as to cause the actual speed stage provided by said gear transmission mechanism to be set to said target speed stage.

A particular problem that has arisen in connection with the control of an automatic transmission in such a way by an electronic control device arises as follows. If the operational parameters of the vehicle change very quickly, such as may occur in the case of quick opening or closing of the throttle valve of the engine of the vehicle by the driver thereof, or such as may occur during simultaneous shifting by the driver of the vehicle of selected transmission speed range and also changing by said driver of the amount of throttle opening of the engine of the vehicle, then it may well occur that the target speed stage for the gear transmission mechanism, as thus read out from the memory means by the electronic control device, differs by more than one speed stage from the actual or current speed stage which is being provided by said gear transmission mechanism. For example, in the case of a gear transmission mechanism which provides three forward speed stages, it may occur that the target speed stage is read out to be the third speed stage, while the current or actual speed stage is the first speed stage; or, by contrast, it may occur that the target speed stage is read out to be the first speed stage, while the current or actual speed stage is the third speed stage. Further, in the case of a gear transmission mechanism which provides more than three forward speed stages, such as in the case of one which provides four or five or more forward speed stages, other combinations of target speed stage and current speed stage which differ by more than one speed stage step are possible, and may well occur.

If it occurs that the target speed stage and the current speed stage come to differ by more than one speed stage step, the electronic control device directly controls the hyraulic fluid pressure control system to immediately switch the supply of actuating hydraulic fluid pressure to said friction engaging mechanisms of said gear transmission mechanism so as to cause the actual speed stage provided by said gear transmission mechanism to be set immediately to said target speed stage, then shifting of said gear transmission mechanism up or down by more than one speed stage step at a time will result, and this can cause undesirable consequences. In the case of an up shift by more than one speed change step at a time, particularly if the throttle opening is rather small, great transmissin shift shock and torque shock can be generated, which deteriorates the drivability of the vehicle. Further, in the case of a down shift by more than one speed change step at a time, particularly if the throttle opening is rather great, not only can great transmission shift shock and torque shock be generated, which again deteriorates the drivability of the vehicle, but also the hydraulic fluid pressure activated friction engaging mechanisms of the gear transmission mechanism, particularly those which are engaged from the disengaged condition in order to provide the low speed stage which is downshifted, may be subjected to unduly high frictional forces, which can cause damage, and can reduce the service life of the automatic transmission and of the transmission as a whole. Further, in this case there is a danger of the vehicle engine to be running at a high speed which can cause slipping of one or more of the activated friction engaging mechanisms. This can cause damage to the transmission.

SUMMARY OF THE INVENTION

Accordingly, it is the primary object of the present invention to provide a method for electronic control of an automatic transmission comprising a gear transmission mechanism with at least three forward speed stages, and a device for implementing the method, which at least sometimes, i.e. at least at the more important times, prevents shifting of the gear transmission mechanism by more than one speed stage at a time, in order to improve durability of the transmission and drivability of the vehicle incorporating it.

It is a further object of the present invention to provide a method for electronic control of an automatic transmission comprising a gear transmission mechanism with at least three forward speed stages, and a device for implementing the method, which at least sometimes prevents upshifting of the gear transmission mechanism by more than one speed stage at a time.

It is a further object of the present invention to provide a method for electronic control of an automatic transmission comprising a gear transmission mechanism with at least three forward speed stages, and a device for implementing the method, which at least sometimes prevents downshifting of the gear transmission mechanism by more than one speed stage at a time.

It is a further object of the present invention to provide a method for electronic control of an automatic transmission comprising a gear transmission mechanism with at least three forward speed stages, and a device for implementing the method, which at least sometimes, both in the case of called for upshifting, and in the case of called for downshifting, prevents shifting of the gear transmission mechanism by more than one speed stage at a time.

It is a further object of the present invention to provide a method for electronic control of an automatic transmission comprising a gear transmission mechanism with at least three forward speed stages, and a device for implementing the method, which, when shifting of the gear transmission mechanism by more than one speed stage at a time to attain a desired i.e. target, speed stage is called for, at least sometimes prevents said multiple shifting and instead shifts the gear transmission mechanism repeatedly by one speed stage step until the desired speed stage is attained, said repeated speed stage shifts being separated in time from one another by a certain predetermined time interval.

It is a further particular object of the present invention to provide a method for electronic control of an automatic transmission comprising a gear transmission mechanism with at least three forward speed stages, and a device for implementing the method, as detailed in the previous object, and which prevents said multiple shifting, at least sometimes, both in the case of called for multiple upshift, and in the case of called for multiple downshift, the predetermined time interval utilized in the case of multiple upshift being the same as that utilized for multiple downshift.

It is a further object of the present invention, alternative to the previously detailed particular object, to provide a method for electronic control of an automatic transmission comprising a gear transmission mechanism with at least three forward speed stages, and a device for implementing the method, as detailed in the second previous object, and which prevents said multiple shifting, at least sometimes, both in the case of called for multiple upshift, and in the case of called for multiple downshift, the predetermined time interval utilized in the case of multiple upshift being different from that utilized for multiple downshift.

It is a further object of the present invention to provide a method for electronic control of an automatic transmission comprising a gear transmission mechanism with at least three forward speed stages, and a device for implementing the method, of any of the types referred to above, in which the times for preventing said multiple upshifting are exactly those when the throttle opening of an internal combustion engine incorporated in the vehicle incorporating the transmission is less than a first predetermined throttle opening value.

It is a further object of the present invention to provide a method for electronic control of an automatic transmission comprising a gear transmission mechanism with at least three forward speed stages, and a device for implementing the method, of any of the types referred to above, in which the times for preventing said multiple downshifting are exactly those when the throttle opening of an internal combustion engine incorporated in the vehicle incorporating the transmission is greater than a second predetermined throttle opening value.

It is a further object of the present invention to provide a method for electronic control of an automatic transmission comprising a gear transmission mechanism with at least three forward speed stages, and a device for implementing the method, of any of the types referred to above, in which the times for preventing said multiple downshifting are exactly those when the throttle opening of an internal combustion engine incorporated in the vehicle incorporating the transmission is greater than a second predetermined throttle opening value; except that when said throttle opening of said internal combustion engine incorporated in the vehicle incorporating the transmission is less than said second predetermined throttle opening value, if a downward manual shift of transmission range has not taken place recently, then multiple downshift is immediately made, while if a downward manual shift of transmission range has taken place recently, then said multiple downshifting is prevented and instead the gear transmission mechanism is downshifted repeatedly by one speed stage step until the desired speed stage is attained, said repeated speed stage shifts being separated in time from one another by a certain predetermined time interval which may be different from the predetermined time intervals pertaining to ordinary multiple downshifting and/or upshifting.

It is yet a further object of the present invention to provide a method for electronic control of an automatic transmission comprising a gear transmission mechanism with at least three forward speed stages, and a device for implementing the meethod, which acts to prevent transmission shift shock, and torque shock, occurring during shifting between speed stages of said gear transmission mechanism, especially during upshifting thereof.

It is yet a further object of the present invention to provide a method for electronic control of an automatic transmission comprising a gear transmission mechanism with at least three forward speed stages, and a device for implementing the method, which gives good drivability of a vehicle incorporating said transmission.

It is yet a further object of the present invention to provide a method for electronic control of an automatic transmission comprising a gear transmission mechanism with at least three forward speed stages, and a device for implementing the method, which gives good engine braking ability of a vehicle incorporating said transmission.

It is yet a further object of the present invention to provide a method for electronic control of an automatic transmission comprising a gear transmission mechanism with at least three forward speed stages, and a device for implementing the method, which improves the durability of said transmission.

It is yet a further object of the present invention to provide a method for electronic control of an automatic transmission comprising a gear transmission mechanism with at least three forward speed stages, and a device for implementing the method, which prevents, during downshifting of said gear transmission mechanism, overrevving of an internal combustion engine of a vehicle incorporating said transmission.

It is yet a further object of the present invention to provide a method for electronic control of an automatic transmission comprising a gear transmission mechanism with at least three forward speed stages, and a device for implementing the method, which prevents, during manual downward range changing of said gear transmission mechanism, overrevving of an internal combustion engine of a vehicle incorporating said transmission.

It is yet a further object of the present invention to provide a method for electronic control of an automatic transmission comprising a gear transmission mechanism with at least three forward speed stages, and a device for implementing the method, which helps to prevent, during downshifting of said gear transmission mechanism, catastrophic failure of an internal combustion engine of a vehicle incorporating said transmission.

It is yet a further object of the present invention to provide a method for electronic control of an automatic transmission comprising a gear transmission mechanism with at least three forward speed stages, and a device for implementing the method, which improves the durability of an internal combustion engine of a vehicle incorporating said transmission.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like reference numerals denote corresponding parts in the various figures, and:

FIG. 1 is a schematic part sectional view, showing a torque converter and a gear transmission mechanism of an automatic transmission, and also showing a hydraulic fluid pressure control device for said gear transmission mechanism, an electronic computer for controlling said hydraulic fluid pressure control device, and sensors which provide input to said electronic computer, all of which is applicable to all the preferred embodiments of the method and apparatus for control of an automatic transmission which will be described;

FIG. 3 is a transition diagram showing target transmission speed stage, applicable in the case that the transmission is in "D" or drive range; the abscissa and throttle opening is shown as the ordinate, showing upshift lines for the shift from the first speed stage to the second speed stage and for the shift from the second speed stage to the third speed stage, and also showing downshift lines for the shift from the second speed stage to the first speed stage and for the shift from the third speed stage to the second speed stage, which is exemplarily applicable to all of the preferred embodiments of the method and apparatus for control of an automatic transmission according to the present invention which will be described;

FIG. 4 is a transition diagram, showing target transmission speed stage in a fashion similar to FIG. 3, applicable in the case that the transmission is in "2" or second range, in which vehicle speed is shown as the abscissa and throttle opening is shown as the ordinate, showing an upshift line for the shift from the first speed stage to the second speed stage, and also showing downshift lines for the shift from the second speed stage to the first speed stage and for the shift from the third speed stage to the second speed stage, which is again exemplarily applicable to all of the preferred embodiments of the method and apparatus for control of an automatic transmission according to the present invention which will be described;

FIG. 5 is a transition diagram, showing target transmission speed stage in a fashion similar to FIGS. 3 and 4, applicable in the case that the transmission is in "L" or low range;

DESCRIPTION OF THE PREFERRED EMBODIMENTS

Figure 2:
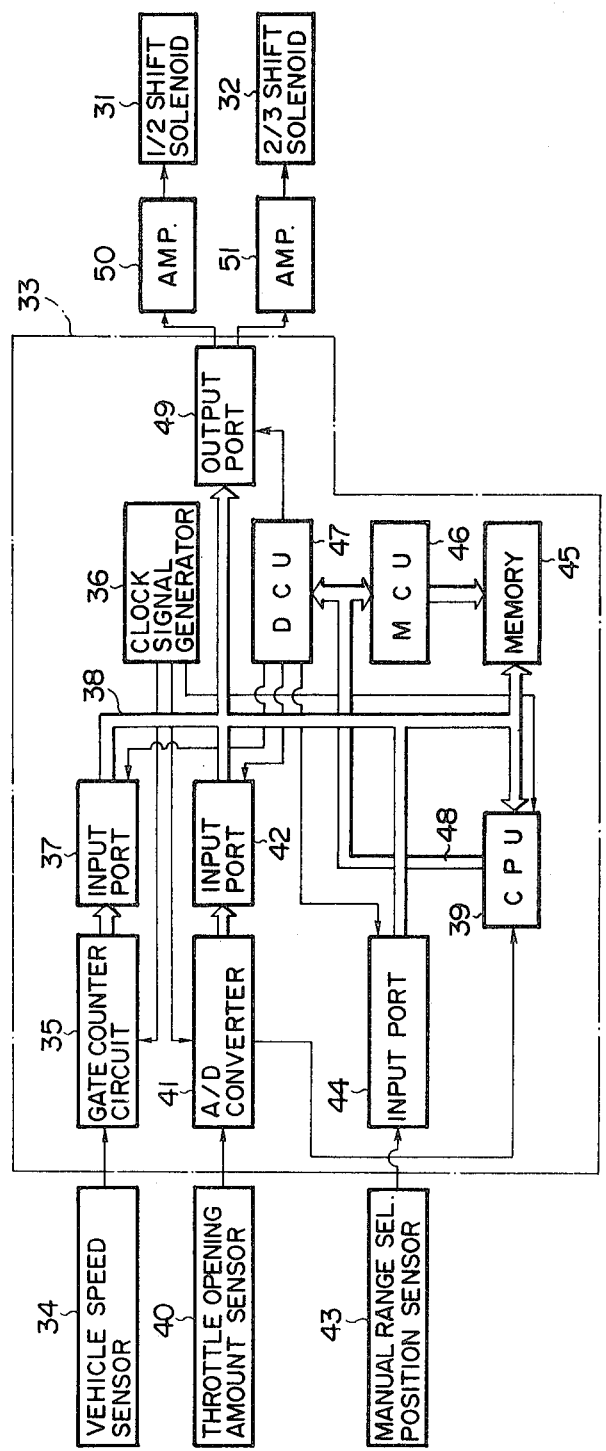
FIG. 2 is a schematic view showing the internal construction of said electronic computer shown in FIG. 1, also showing said sensors and two electromechanical output systems for said electronic computer.

The present invention will now be described with reference to several preferred embodiments thereof, and with reference to the appended drawings.

GENERAL CONSTRUCTION OF THE AUTOMATIC TRANSMISSION AND ALL OF THE APPARATUS EMBODIMENTS

FIG. 1 shows the general construction of the mechanical parts of an automatic transmission suitable for control by any of the preferred embodiments of the apparatus according to the present invention, in the manner of any of the preferred embodiments of the method according to the present invention, and also shows an apparatus, generally according to the present invention, for controlling this automatic transmission generally according to the method of the present invention. Further, FIG. 1 shows exemplary sensors which feed signals of an exemplary nature to said apparatus. In this figure, the reference numeral 1 denotes a fluid torque converter and the reference numeral 2 denotes a gear transmission mechanism which is capable of providing three forward speed stages and one reverse speed stage, as will be seen hereinafter.

The fluid torque converter 1, which is of a per se well known type, comprises a pump impeller 3, a turbine member 4, and a stator member 5, all of which cooperate in a conventional manner to define a toroidal hydraulic fluid chamber, circulation of hydraulic fluid around which in the general manner of a smoke ring is adapted to transfer torque from the pump impeller 3 to the turbine member 4, with a certain amount of torque amplification and possibly of slippage therebetween. The pump impeller 3 is rotationally coupled to a power input shaft 6 of the torque converter 1 and of the transmission as a whole, which may in fact be the crankshaft of an engine such as the internal combustion engine, not shown in the drawings, of a vehicle also not shown. The turbine member 4 is rotationally coupled to a turbine shaft 7 which acts as a power output shaft of the torque converter 1 and also as a power input shaft of the gear transmission mechanism 2. And the stator member 5 is rotatably mounted via a one way clutch to a fixed member of the torque converter 1 in a per se well known fashion.

The turbine shaft 7 which inputs rotary power to the gear transmission mechanism 2 is rotationally coupled to the outer member of a hydraulically activated clutch 11 and is also rotationally coupled to the inner member of another hydraulically activated clutch 12. The inner member of the hydraulically activated clutch 11 is rotationally coupled to an intermediate shaft 8, and the outer member of the hydraulically activated clutch 12 is rotationally coupled to a sun gear shaft 9 which is selectively rotationally coupled, via a hydraulically activated brake 14, to the casing 13 of the gear transmission mechanism 2. The sun gear shaft 9 is also selectively rotationally coupled in one rotational direction only to said casing 13 of the gear transmission mechanism 2 by the series combination of a one way clutch 15 and another hydraulically activated brake 16, and further supports by its right hand portion as seen in FIG. 1 an elongated sun gear 17, which forms part of two planetary gear mechanisms. In detail, to the left hand end of the elongated sun gear 17 there is meshed a planetary pinion 19 (actually of course several planetary pinions such as the planetary pinion 19 are provided, but only one of them can be seen in the figure and only this one will be further discussed herein) which is rotatably supported on a carrier 18. The carrier 18 is rotatably supported by a fixed member of the gear transmission mechanism 2 via a one way clutch 21, and is also selectively rotationally coupled, via a third hydraulically activated brake 20, to the casing 13 of the gear transmission mechanism 2. To the outside of the planetary pinion 19 there is meshed a ring gear 22, which is rotationally coupled to a power output shaft 10 of the gear transmission mechanism 2 and of the transmission as a whole. Further, to the right hand end of the elongated sun gear 17 there is meshed another planetary pinion 24 (actually again of course several planetary pinions such as the planetary pinion 24 are provided, but only one of them can be seen in the figure and only this one will be further discussed herein) which is rotatably supported on a carrier 23. The carrier 23 is rotationally coupled to the ring gear 22 and to the power output shaft 10. Further, to the outside of the planetary pinion 24 there is meshed a ring gear 25, which is rotationally coupled to the intermediate shaft 8, previously mentioned.

The clutches 11 and 12 and the brakes 14, 16, and 20 are all of per se well known sorts, and are individually selectively engaged and disengaged by selective supply of engaging hydraulic fluid pressures, and these engaging hydraulic fluid pressures are selectively supplied by a hydraulic fluid pressure control device 30 which is to be described in more detail later in combinations which are shown in the appended Table, so as to control the gear transmission mechanism 2 to provide any one of three forward speed stages—a first forward speed stage, a second forward speed stage, and a third forward speed stage—and one reverse speed stage, as well as a neutral speed stage. In the appended Table, an "O" denotes engagement of a friction engaging device, i.e. a hydraulically activated clutch or a hydraulically activated brake, an "X" indicates disengagement of such a friction engaging device or of a one way clutch, and an "H" indicates engagement of a one way clutch when rotational power is being input into the transmission in its preferred direction by the engine (not shown) via the power input shaft 6 and is being taken out via the power output shaft 10, i.e. when the vehicle incorporating the transmission is operating in the non-overrun operational condition, and disengagement of said one way clutch when said vehicle is operating in the overrun operational condition.

The hydraulic fluid pressure control device 30 is of a per se well known sort, comprising a hydraulic fluid pump, a line pressure regulation valve, a first/second shift valve, a second/third shift valve, and a manual range selector. The manual range selector, in this exemplary automatic transmission, can be set to any one of "D" or drive range, "2" of two range, "L" or low range, "R" or reverse range, "N" or neutral range, and "P" or parking range. The first/second shift valve and the second/third shift valve each are selectively driven between two positions by, respectively, a first/second shift solenoid 31 and a second/third shift solenoid 32. According to the switched position of the manual range selector and according to the activation conditions of the first/second shift solenoid 31 and of the second/third shift solenoid 32, via an electronic control mechanism which will in due course be explained, the hydraulic fluid pressure control device 30 supplies hydraulic fluid pressure to the clutches and brakes detailed above of the gear transmission mechanism 2 according to the combinations given in the Table, so as to provide the desired transmission stage. In this connection, by the way, although it is not so shown in the drawing because it is not strictly relevant to the present invention, the gear transmission mechanism 2 also comprises a locking mechanism for the power output shaft 10 for use when the manual range selector is set to "P" or parking range, and this locking mechanism is also selectively hydraulically activated by the hydraulic fluid pressure control device 30, when the manual range selector is set to "P" or parking range.

The first/second shift solenoid 31 and of the second/third shift solenoid 32 are selectively provided with actuating electrical energy by an electronic computer 33 which may be a microcomputer, via a first/second power amplifier 50 and a second/third power amplifier 51 respectively, which amplify the power of the electrical signals output by the computer 33. Also, although it is not specifically so shown in the drawing, the computer 33 is provided with a means for controlling the hydraulic fluid pressure control device 30 to activate the above mentioned output shaft locking mechanism, when the manual range selector is set to "P" or parking range. The computer 33 receives output signals from a vehicle speed sensor 34, a throttle opening amount sensor 40, and a manual range selector position sensor 43, and based upon these input signals selectively provides actuating electrical energy for the first/second shift solenoid 31 and of the second/third shift solenoid 32 and for the above mentioned output shaft locking mechanism.

In FIG. 2, there is shown the internal construction of the computer 33, which is of a per se well known kind, in more detail, and also the connections of the first/second power amplifier 50 and the second/third power amplifier 51 and of the vehicle speed sensor 34, the throttle opening amount sensor 40, and the manual range selector position sensor 43 to said computer 33 are shown in detail. Again, this structure of the computer 33, etc., is applicable to any of the preferred embodiments of the apparatus according to the present invention, for practicing any of the preferred embodiments of the method according to the present invention. The various components of the computer 33, including a central processing unit or CPU 39, are interconnected for the purposes of transmission of data by a common bus 38.

The speed sensor 34 produces a pulse signal of a frequency proportional to the road speed of the vehicle to which the shown transmission is fitted, and this pulse signal is fed to a gate counter circuit 35 as a gate signal. The gate counter circuit 35 also receives a clock signal from a clock signal generator 36, counts the number of clock pulses in each cycle of the gate signal, and sends the counted result to an input port 37, which sends this signal to the central processing unit 39 via the common bus 38, at appropriate timing points, as a digital signal representative of the road speed of the vehicle. The throttle opening amount sensor 40 produces an analog signal (which in fact is a voltage signal) representative of the current throttle opening of the throttle of the vehicle to which the shown transmission is fitted, and supplies this signal to an analog to digital converter or an A/D converter 41. The A/D converter 41 converts this analog voltage signal to a digital signal and sends the converted result to another input port 42, which sends this signal to the central processing unit 39 via the common bus 38, at appropriate timing points, as a digital signal representative of the throttle opening of the vehicle. The manual range selector position sensor 43 senses to what transmission range the manual range selector (not shown) is currently positioned by the hand of the driver of the vehicle, and produces a signal corresponding thereto which it sends to an input port 44. And the input port 44 sends a digital signal corresponding thereto to the central processing unit 39 via the common bus 38, at appropriate timing points, as a digital signal representative of the currently selected transmission range of the vehicle. Further, the central processing unit 39, as will be seen later, outputs control digital signals representing a commanded transmission speed stage via the common bus 38 to an output port 49, which transforms these digital signals into control signals which, after being amplified by the first/second power amplifier 50 and the second/third power amplifier 51, respectively are dispatched as control signals to the first/second shift solenoid 31 and to the second/third shift solenoid 32 which based thereon so control the hydraulic fluid pressure control mechanism 30 as to engage the commanded speed stage of the gear transmission mechanism 2 by selectively engaging the appropriate ones of the friction engaging mechanisms of the gear transmission mechanism 2.

The central processing unit 39 is of a per se well known sort, and comprises general registers, an operational circuit, a program counter, etc., and is adapted to send out control command signals, via a control bus 48, to a memory control unit or MCU 46 which controls a memory device 45 and to a device control unit or DCU 47 which controls the input ports 37, 42, and 44. The memory device 45 is connected to the central processing unit 39 in both directions via the common bus 48, which is a two way bus, and comprises a read only memory or RAM and a random access memory or ROM, neither of which is particularly shown in the figure. The read only memory or ROM contains the program for determining the actions of the central processing unit 39, tables which determine the target transmission stages for each operating range of the automatic transmission with reference to vehicle road speed and engine load, as will be more particularly explained later, and various constant coefficients for purposes of computation. Further, the random access memory or RAM is used for temporarily memorizing the values of the signals representing vehicle road speed, vehicle throttle opening, and selected transmission range which have come from the vehicle road speed sensor 34, the throttle opening amount sensor 40, and the manual range selector position sensor 43, for storing various intermediate computation results, and for general computational purposes.

FIG. 3, FIG. 4, and FIG. 5 show tables whose equivalents are digitally stored in the read only memory or ROM, as mentioned above. These tables show target transmission speed stage, i.e. desired transmission speed stage, for each of the transmission ranges—"D" or drive range, "2" or second range, and "L" or low range—in which it is possible to engage more than one speed stage, respectively, as a function of vehicle road speed (as detected by the vehicle road speed sensor 34) and vehicle load or throttle opening (as detected by the throttle opening amount sensor 40).

In more detail, in FIG. 3, in which vehicle speed is shown as the abscissa and throttle opening is shown as the ordinate, and which relates to the case in which the vehicle manual range selector is set to "D" or drive range, the leftmost solid line shows the boundary between the region in which first speed stage is the target or desired transmission speed stage and the region in which second speed stage is the target or desired transmission speed stage, in the case of an upshift from first speed stage to second speed stage; the rightmost solid line shows the boundary between the region in which second speed stage is the target or desired transmission speed stage and the region in which third speed stage is the target or desired transmission speed stage, in the case of an upshift from second speed stage to third second speed stage; the leftmost broken line shows the boundary between the region in which first speed stage is the target or desired transmission speed stage and the region in which second speed stage is the target or desired transmission speed stage, in the case of a downshift from second speed stage to first speed stage; and the rightmost broken line shows the boundary between the region in which second speed stage is the target or desired transmission speed stage and the region in which third speed stage is the target or desired transmission speed stage, in the case of a downshift from third speed stage to second speed stage.

Further, in FIG. 4, in which vehicle speed is shown as the abscissa and throttle opening is shown as the ordinate, and which relates to the case in which the vehicle manual range selector is set to "2" or second range, the solid line shows the boundary between the region in which first speed stage is the target or desired transmission speed stage and the region in which second speed stage is the target or desired transmission speed stage, in the case of an upshift from first speed stage to second speed stage; the leftmost broken line shows the boundary between the region in which first speed stage is the target or desired transmission speed stage and the region in which second speed stage is the target or desired transmission speed stage, in the case of a downshift from second speed stage to first speed stage; and the rightmost broken line shows the boundary between the region in which second speed stage is the target or desired transmission speed stage and the region in which third speed stage is the target or desired transmission speed stage, in the case of a downshift from third speed stage to second speed stage. In this figure, no solid line is shown for indicating any boundary between any region in which second speed stage is the target or desired transmission speed stage and any region in which third speed stage is the target or desired transmission speed stage, in the case of an upshift from second speed stage to third speed stage, because when the vehicle manual range selector is set to "2" or second range no upshift from second to third speed stage is ever desirable when the vehicle manual range selector is set to "2" or second range.

Yet further, in FIG. 5, in which vehicle speed is shown as the abscissa and throttle opening is shown as the ordinate, and which relates to the case in which the vehicle manual range selector is set to "L" or low range, the broken line shows the boundary between the region in which first speed stage is the target or desired transmission speed stage and the region in which second speed stage is the target or desired transmission speed stage, in the case of a downshift from second speed stage to first speed stage. In this figure, no solid line is shown for indicating any boundary between any region in which first speed stage is the target or desired transmission speed stage and any region in which second speed stage is the target or desired transmission speed stage, in the case of an upshift from first speed stage to second speed stage, because when the vehicle manual range selector is set to "2" or second range no upshift from first to second speed stage is ever desirable; and no lines are shown for any boundary between any region in which second speed stage is the target or desired transmission speed stage and any region in which third speed stage is the target or desired transmission speed stage, either for the case of upshift or downshift between second speed stage and third speed stage, because third speed stage is never the target or desired transmission speed stage when the vehicle manual range selector is set to "L" or low range.

Broadly speaking, in the case of any one of the preferred embodiments of the present invention, the functioning of the central processing unit 39 is as follows. First, depending on the transmission range which is currently selected by the hand of the vehicle driver on the manual range selector as sensed by the manual range selector position sensor 43, depending on the current value of vehicle road speed as sensed by the vehicle road speed sensor 34, depending on the current value of vehicle throttle opening as sensed by the throttle opening amount sensor 43, and depending on the actual current transmission speed stage which is engaged, the central processing unit executes a program which decides, based upon the representations stored in the read only memory or ROM of the tables schematically shown in FIGS. 3, 4, and 5, what the desired or target transmission speed stage is at the current instant. Then, if the central processing unit 39 determines that the difference between the actual current transmission speed stage and the target or desired speed stage is not two or greater, then said central processing unit 39 immediately outputs, via the common bus 38, a control signal commanding the target or desired speed stage to the output port 49 which is translated thereby into signals to the first/second power amplifier 50 and the second/third power amplifier 51 which are respectively amplified thereby into signals to the first/second shift solenoid 31 and to the second/third shift solenoid 32 which so control the hydraulic fluid pressure control mechanism 30 as to immediately engage said commanded target or desired speed stage of the gear transmission mechanism 2 by selectively engaging the appropriate ones of the friction engaging mechanisms of the gear transmission mechanism 2, according to the appended Table. On the other hand, particularly according to the essential concept of the present invention, if the central processing unit 39 determines that the difference between the actual current transmission speed stage and the target or desired speed stage is two or greater (i.e., in the shown exemplary form of the automatic transmission to be controlled, which has only three forward speed stages, if the actual current speed stage is the first speed stage and the target or desired speed stage is the third speed stage, or alternatively if the actual current speed stage is the third speed stage and the target or desired speed stage is the first speed stage), then at least in some circumstances said central processing unit 39 does not immediately output a control signal to the output port 49 commanding the target or desired speed stage from the gear transmission mechanism 2, but instead at appropriately delayed intervals outputs control signals to the output port 49 commanding changes of speed stage from the gear transmission mechanism 2 by one speed stage at a time, so as to effect a gradual changing of speed stage in delayed steps from the actual current speed stage via at least one intermediate speed stage to the target or desired speed stage. This results in much improved quality of shifting, thus minimizing transmission shift shock, reducing wear on the friction engaging mechanisms and other parts of the transmission, increasing drivability of the vehicle incorporating the transmission, and increasing the service life of the power train as a whole. Further, the danger of overrevving of the engine of the vehicle, due to slipping of the friction engaging mechanisms during downshifting at high throttle opening, is much reduced.

It should be understood that the applicability of the apparatus and method according to the present invention is not limited to the case of a gear transmission mechanism with only three forward speed stages, although the shown gear transmission mechanism 2 in fact only has three forward speed stages. In fact, the present invention is equally, if not in fact more, applicable to the case in which the gear transmission mechanism which is to be controlled has four or five or more forward speed stages; but the case of only three forward speed stages has been chosen for the exemplary gear transmission mechanism 2 to be controlled which has been shown in this specification, in the interests of economy and ease of explanation and of comprehensibility of the essence of the present invention. The preceding explanation will easily be altered, by one skilled in the transmission art, based upon the concepts disclosed herein, to fit the case of such a gear transmission mechanism which has more than three forward speed stages. Further, the statement of the essential concept of the present invention, made in the preceding paragraph, is exactly applicable to the case of a gear transmission mechanism which has more than three forward speed stages.

DETAILS OF THE FIRST APPARATUS AND THE FIRST METHOD EMBODIMENT

Now, the details of the first preferred embodiment of the apparatus for controlling an automatic transmission according to the present invention, which practices the first preferred embodiment of the method for controlling an automatic transmission according to the present invention, will be explained. In this first preferred embodiment, although it is not so shown in the figures, the computer 33 further incorporates a timer, which when set to the ON mode stays in the ON mode for a certain predetermined time interval before going into the OFF mode, and which may use clock pulses from the clock pulse generator 36, for example.

Figure 6:
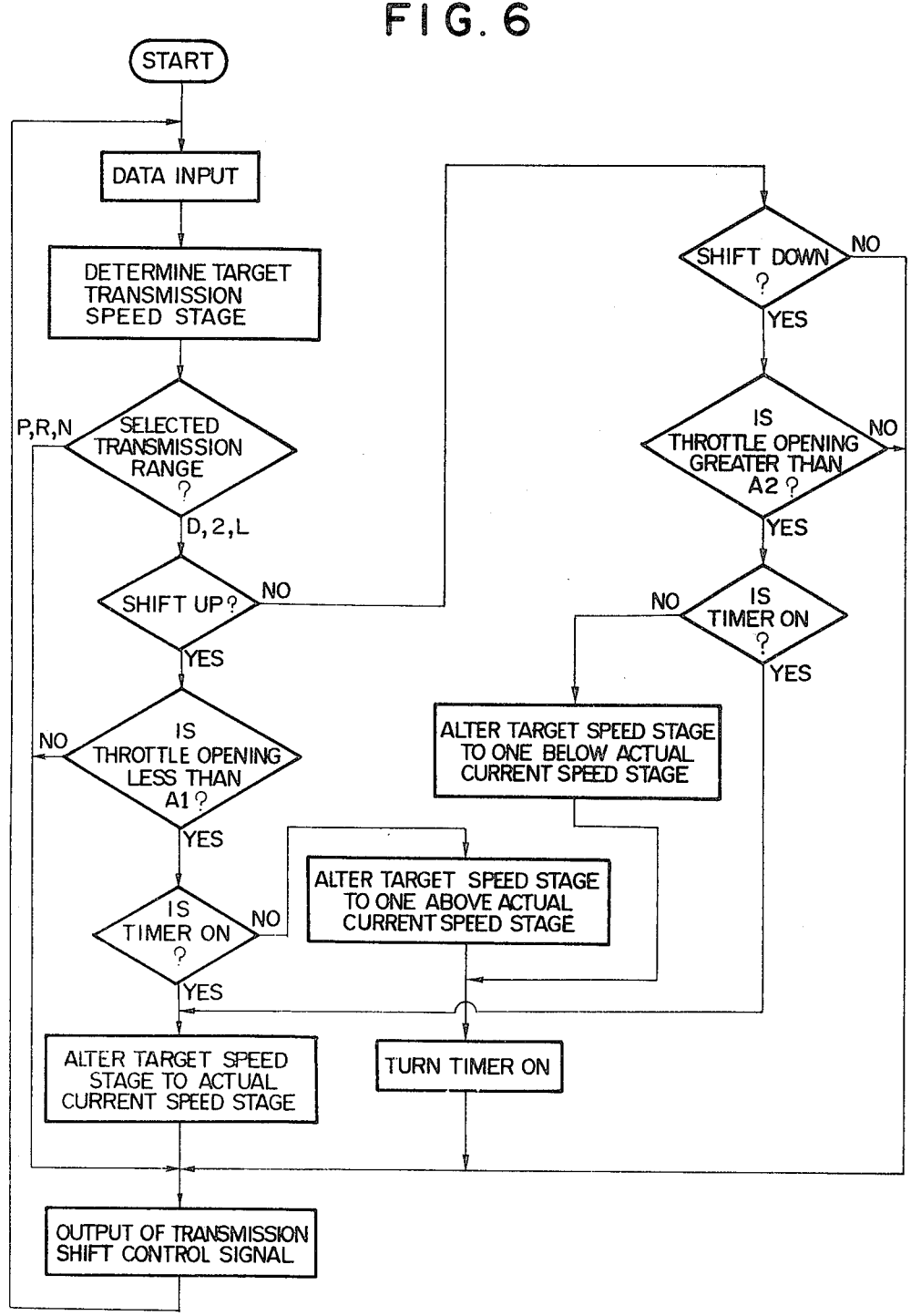
FIG. 6 is a flow chart, illustrating the operation of a program for the electronic computer shown in FIGS. 1 and 2 which implements the first preferred embodiment of the method for control of an automatic transmission according to the present invention.

In FIG. 6, there is shown a flowchart of a computer program preloaded into the read only memory or RAM of the memory device 45 of the computer 33 of the first preferred embodiment of the apparatus according to the present invention, which is obeyed by said computer 33 and which results in the apparatus as a whole practicing the first preferred embodiment of the method according to the present invention. The steps of this flowchart will now be gone through in the following description, in order; various particular details of the programming, descriptions of which are omitted, will be easily filled in by one skilled in the computer art, based upon the disclosure herein.

First, when the computer 33 first starts to operate, in the START block, the central processing unit or CPU 39 initializes the various variables in the random access memory or RAM of the memory device 45. Then control is passed to enter next the DATA INPUT block.

In the DATA INPUT block the central processing unit 39 inputs data on the current road speed of the vehicle from the vehicle road speed sensor 34, on the current value of throttle opening from the throttle opening amount sensor 40, and on the transmission range currently selected by the driver of the vehicle from the manual range selector position sensor 43. These data are stored by the central processing unit 39 in appropriate locations in the random access memory or RAM of the memory device 45. Then control is passed to enter next the DETERMINE TARGET TRANSMISSION SPEED STAGE block, and here it reads out from the read only memory or ROM of the memory device 45, i.e. from the above described representations stored therein of the tables for upshift and downshift between transmission gear speed stages such as are exemplarily shown in FIGS. 3, 4, and 5, the desired or target transmission speed stage, i.e. the transmission speed stage in which it is desired that the transmission should currently be functioning. Of course, since as has been suggested above and will be seen later the central processing unit 39 runs through this program which is being explained repeatedly in a tightly closed cycle, repeating said program several times per second, usually this desired or target transmission speed stage will in fact be the current speed stage in which the transmission in fact is already currently functioning; but if the indicated values of current road speed of the vehicle from the vehicle road speed sensor 34, of the current value of throttle opening from the throttle opening amount sensor 40, and of the transmission range currently selected by the driver of the vehicle from the manual range selector position sensor 43 have been quickly changing, then this desired or target transmission speed stage may differ from the speed stage in which the transmission in fact is already currently functioning, by one or perhaps by even more than one speed stage.

Next, in the SELECTED TRANSMISSION RANGE? decision block, the central processing unit 39 decides whether the transmission range currently selected by the driver of the vehicle, as determined from the signal from the manual range selector position sensor 43, is one of the "P" or parking range, the "R" or reverse range, or the "N" or neutral range, or alternatively is one of the "D" or drive range, the "2" or second range, or the "L" or low range; and based upon the result of this decision control is respectively either passed to the point Z in FIG. 6, so as to enter next the block OUTPUT OF TRANSMISSION SHIFT CONTROL SIGNAL, or alternatively is passed to enter next the SHIFT UP? decision block.

In the OUTPUT OF TRANSMISSION SHIFT CONTROL SIGNAL block, the central processing unit or CPU 39 outputs, via the common bus 38, a control signal commanding the target or desired speed stage to the output port 49 which is translated thereby into signals to the first/second power amplifier 50 and the second/third power amplifier 51 which are respectively amplified thereby into signals to the first/second shift solenoid 31 and to the second/third shift solenoid 32 which so control the hydraulic fluid pressure control mechanism 30 as to immediately engage said commanded target or desired speed stage of the gear transmission mechanism 2 by selectively engaging the appropriate ones of the friction engaging mechanisms of the gear transmission mechanism 2, according to the appended Table.

In the SHIFT UP? decision block, the central processing unit 39 decides whether or not a shift up of the transmission is being called for; i.e. whether or not the desired or target transmission speed stage is higher than the speed stage in which the transmission in fact is already currently functioning, and if the answer is YES then control is passed to enter next the IS THROTTLE OPENING LESS THAN A1? decision block, while if the answer is NO then control is passed to enter next the SHIFT DOWN? decision block, which will be explained later.

In the IS THROTTLE OPENING LESS THAN A1? decision block, the central processing unit 39 decides whether or not the current value of throttle opening, as indicated by the throttle opening amount sensor 40, is less than a predetermined value A1, or not, and if the answer is NO then control is passed to the point Z in FIG. 6, so as to enter next the block OUTPUT OF TRANSMISSION SHIFT CONTROL SIGNAL and so as to set the transmission to the target speed range, while if the answer is YES then control is passed to enter next the IS TIMER ON? decision block. This block is to check, in the case of a proposed upshift of the transmission by more than one shift stage together being performed in the gradual step by step upshifting of the transmission, if a predetermined time has elapsed for one step upshifting, as will be explained later.

In the IS TIMER ON? decision block, the central processing unit 39 decides whether or not the timer is in the ON state, and if the answer is YES then control is passed to enter next the block ALTER TARGET SPEED STAGE TO ACTUAL CURRENT SPEED STAGE; while if the answer is NO then control is passed to enter next the ALTER TARGET SPEED STAGE TO ONE ABOVE ACTUAL CURRENT SPEED STAGE block.

In the ALTER TARGET SPEED STAGE TO ACTUAL CURRENT SPEED STAGE block, the central processing unit or CPU 39 sets the desired or target speed stage to be equal to the speed stage in which the transmission in fact is currently functioning, and then control is passed to enter next the OUTPUT OF TRANSMISSION SHIFT CONTROL SIGNAL block.

On the other hand, in the ALTER TARGET SPEED STAGE TO ONE ABOVE ACTUAL CURRENT SPEED STAGE block, the central processing unit 39 sets the desired or target speed stage to be only one speed stage higher than the speed stage in which the transmission is in fact currently already functioning, even though the proper desired or target transmission speed stage at this time, as read out from the read only memory or ROM of the memory device 45 according to the tables shown in FIGS. 3, 4, and 5, may in fact be two speed stages or more higher than the speed stage in which the transmission is currently functioning.

Then control passes to enter next the TURN TIMER ON block. In this TURN TIMER ON block, the central processing unit 39 turns the timer, already mentioned, to the ON state, so that said timer starts to measure a certain predetermined time interval before going to the OFF state again. Then control is passed to the point Z in FIG. 6, so as to enter next the OUTPUT OF TRANSMISSION SHIFT CONTROL SIGNAL block and so as to set the transmission to the target speed stage, which as mentioned above is now exactly one speed stage higher than the current speed stage.

In the SHIFT DOWN? decision block, which as explained above is proceeded to from the SHIFT UP? decision block, the central processing unit 39 decides whether or not a shift down of the transmission is being called for; i.e. whether or not the desired or target transmission speed stage is lower than the speed stage in which the transmission in fact is already currently functioning, and if the answer is YES then control is passed to enter next the IS THROTTLE OPENING GREATER THAN A2? decision block, while if the answer is NO then control is passed to the point Z in FIG. 6, so as to enter next the block OUTPUT OF TRANSMISSION SHIFT CONTROL SIGNAL and so as to set the transmission to the target speed stage, which in fact here is obviously the same as the currently engaged speed stage.

In the IS THROTTLE OPENING GREATER THAN A2? decision block, the central processing unit 39 decides whether or not the current value of throttle opening, as indicated by the throttle opening amount sensor 40, is greater than a predetermined value A2, or not, and if the answer is NO then control is passed to the point Z in FIG. 6, while if the answer is YES then control is passed to enter next the second IS TIMER ON? decision block. This block is to check, in the case of a proposed downshift of the transmission by more than one shift stage together, being performed in the gradual step by step downshifting of the transmission, if a predetermined time has elapsed for one step downshifting, as explained later.

In the second IS TIMER ON? decision block, the central processing unit 39 decides whether or not the timer is in the ON state, and if the answer is YES then control is passed to the point X in FIG. 6, so as to enter next the block ALTER TARGET SPEED STAGE TO ACTUAL CURRENT SPEED STAGE.

In the ALTER TARGET SPEED STAGE TO ONE BELOW ACTUAL CURRENT SPEED STAGE block, the central processing unit 39 sets the desired or target speed stage to be only one speed stage lower than the speed stage in which the transmission is in fact currently already functioning, even though the proper desired or target transmission speed stage at this time, as read out from the read only memory or ROM of the memory device 45 according to the tables shown in FIGS. 3, 4, and 5, may in fact be two speed stages or more lower than the speed stage in which the transmission is currently functioning. Then control passes to enter next the previously explained TURN TIMER ON block, whence as has been previously seen it proceeds to the point Z in FIG. 6.

Thus, it will be seen that the overall effect of the operation of the first preferred embodiment of the transmission control device according to the present invention shown above, according to the first preferred embodiment of the transmission control method according to the present invention, is that, when the target transmission speed stage comes to differ by only one speed stage step from the actual or current speed stage which is being provided by the gear transmission mechanism, then the gear transmission mechanism is set forthwith to said target speed stage, i.e. upshifting or downshifting by one speed stage is performed immediately. On the other hand, when the target transmission speed stage comes to differ by more than one speed stage step upward relative to the actual or current speed stage which is being provided by the gear transmission mechanism, then the gear transmission mechanism is shifted up by one speed stage step at a time, said upshifts being separated from one another in time by a predetermined time interval which is substantially equal to the characteristic time interval of the timer, provided that throttle opening is less than the first predetermined value A1; but if throttle opening is greater than said first predetermined value A1, then according to this first preferred embodiment it is deemed that step by step upshifting is not required in this case, since the danger of transmission torque shock occurring during multiple upshifting is not nearly so great in the case of higher throttle openings. Further, when the target transmission speed stage comes to differ by more than one speed stage step downward relative to the actual or current speed stage which is being provided by the gear transmission mechanism, then the gear transmission mechanism is shifted down by one speed stage step at a time, said downshifts being separated from one another in time by a predetermined time interval which is again substantially equal to the characteristic time interval of the timer, provided that throttle opening is greater than the second predetermined value A2; but if throttle opening is less than said second predetermined value A2, then according to this first preferred embodiment it is deemed that step by step downshifting is not required in this case, since the danger of transmission torque shock and possible slippage occurring during multiple downshifting is not nearly so great in the case of lower throttle openings.

Particularly in the case of the first preferred embodiment shown, the predetermined time interval between repeated downshifts, when they occur, is the same as the predetermined time interval between repeated upshifts. This is because only one timer is provided, and its characteristic time interval is used both in the case of upshifting and downshifting; but this is not essential to the present invention. Further, although step by step upshifting in the shown first preferred embodiment is dispensed with when the throttle opening is less than the first predetermined value A1, and similarly although step by step downshifting in the shown first preferred embodiment is dispensed with when the throttle opening is greater than the second predetermined value A2, these features are not essential to the present invention, but are merely features of the particular first preferred embodiment shown.

DETAILS OF THE SECOND APPARATUS AND THE SECOND METHOD EMBODIMENT

Now, the details of the second preferred embodiment of the apparatus for controlling an automatic transmission according to the present invention, which practices the second preferred embodiment of the method for controlling an automatic transmission according to the present invention, will be explained. In this second preferred embodiment, although it is not so shown in the figures, the computer 33 further incorporates three timers, a first timer, a second timer, and a third timer, each of which when set to the ON mode stays in the ON mode for a certain predetermined time interval before going into the OFF mode, and each of which may use clock pulses from the clock pulse generator 36, for example. The predetermined time intervals for the three timers may be, and indeed usually will be, different, for reasons which will be explained later.

Figure 7A:
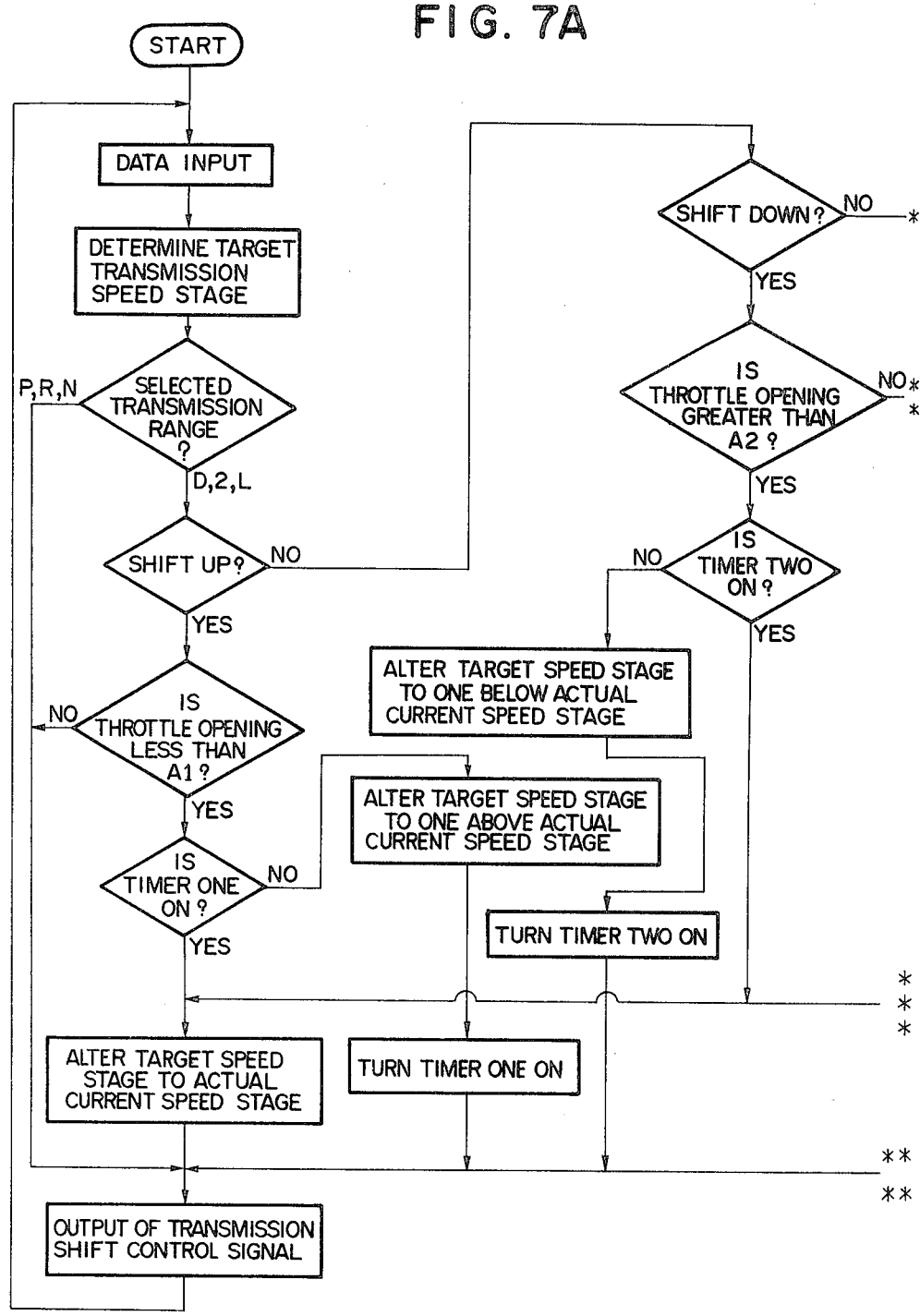
FIGS. 7a and 7b, in combination, constitute a flow chart, similar to FIG. 6, illustrating the operation of a program for the electronic computer shown in FIGS. 1 and 2 which implements the second preferred embodiment of the method for control of an automatic transmission according to the present invention.
Figure 7B:
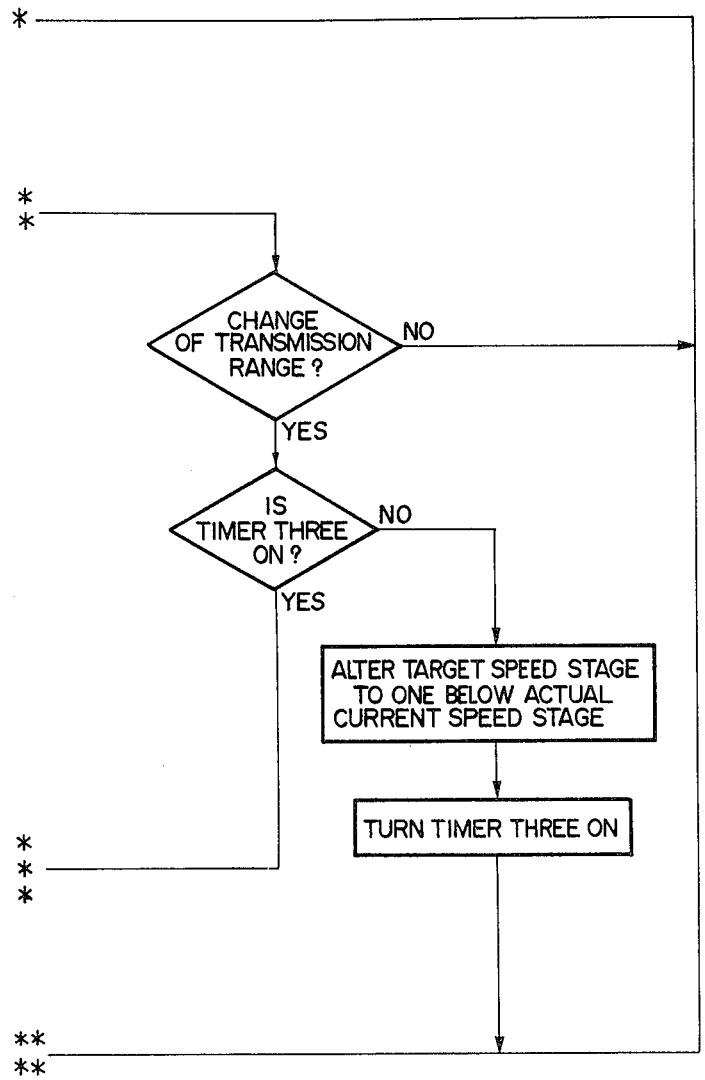

In FIGS. 7a and 7b, there is shown a flowchart of a computer program preloaded into the read only memory or RAM of the memory device 45 of the computer 33 of the second preferred embodiment of the apparatus according to the present invention, which is obeyed by said computer 33 and which results in the apparatus as a whole practicing the second preferred embodiment of the method according to the present invention. The steps of this flowchart will now be gone through in the following description, in order; various particular details of the programming, descriptions of which are omitted, will be easily filled in by one skilled in the computer art, based upon the disclosure herein.

First, when the computer 33 first starts to operate, in the START block, the central processing unit or CPU 39 initializes the various variables in the random access memory or RAM of the memory device 45. Then control is passed to enter next the DATA INPUT block.

In the DATA INPUT block the central processing unit 39 inputs data on the current road speed of the vehicle from the vehicle road speed sensor 34, on the current value of throttle opening from the throttle opening amount sensor 40, and on the transmission range currently selected by the driver of the vehicle from the manual range selector position sensor 43. These data are stored by the central processing unit 39 in appropriate locations in the random access memory or RAM of the memory device 45. Then control is passed to enter next the DETERMINE TARGET TRANSMISSION SPEED STAGE block, and here it reads out from the read only memory or ROM of the memory device 45, i.e. from the above described representations stored therein of the tables for upshift and downshift between transmission gear speed stages such as are exemplarily shown in FIGS. 3, 4, and 5, the desired or target transmission speed stage, i.e. the transmission speed stage in which it is desired that the transmission should currently be functioning. Of course, since as has been suggested above and will be seen later the central processing unit 39 runs through this program which is being explained repeatedly in a tightly closed cycle, repeating said program several times per second, usually this desired or target transmission speed stage will in fact be the current speed stage in which the transmission in fact is already currently functioning; but if the indicated values of current road speed of the vehicle from the vehicle road speed sensor 34, of the current value of throttle opening from the throttle opening amount sensor 40, and of the transmission range currently selected by the driver of the vehicle from the manual range selector position sensor 43 have been quickly changing, then this desired or target transmission speed stage may differ from the speed stage in which the transmission in fact is already currently functioning, by one or perhaps by even more than one speed stage.

Next, in the SELECTED TRANSMISSION RANGE? decision block, the central processing unit 39 decides whether the transmission range currently selected by the driver of the vehicle, as determined from the signal from the manual range selector position sensor 43, is one of the "P" or parking range, the "R" or reverse range, or the "N" or neutral range, or alternatively is one of the "D" or drive range, the "2" or second range, or the "L" or low range; and based upon the result of this decision control is respectively either passed to the point Z in FIG. 7, so as to enter next the block OUTPUT OF TRANSMISSION SHIFT CONTROL SIGNAL, or alternatively is passed to enter next the SHIFT UP? decision block.

In the OUTPUT OF TRANSMISSION SHIFT CONTROL SIGNAL block, the central processing unit or CPU 39 outputs, via the common bus 38, a control signal commanding the target or desired speed stage to the output port 49 which is translated thereby into signals to the first/second power amplifier 50 and the second/third power amplifier 51 which are respectively amplified thereby into signals to the first/second shift solenoid 31 and to the second/third shift solenoid 32 which so control the hydraulic fluid pressure control mechanism 30 as to immediately engage said commanded target or desired speed stage of the gear transmission mechanism 2 by selectively engaging the appropriate ones of the friction engaging mechanisms of the gear transmission mechanism 2, according to the appended Table.

In the SHIFT UP? decision block, the central processing unit 39 decides whether or not a shift up of the transmission is being called for; i.e. whether or not the desired or target transmission speed stage is higher than the speed stage in which the transmission in fact is already currently functioning, and if the answer is YES then control is passed to enter next the IS THROTTLE OPENING LESS THAN A1? decision block, while if the answer is NO then control is passed to enter next the SHIFT DOWN? decision block, which will be explained later.

In the IS THROTTLE OPENING LESS THAN A1? decision block, the central processing unit 39 decides whether or not the current value of throttle opening, as indicated by the throttle opening amount sensor 40, is less than a predetermined value A1, or not, and if the answer is NO then control is passed to the point Z in FIG. 7a, so as to enter next the block OUTPUT OF TRANSMISSION SHIFT CONTROL SIGNAL and so as to set the transmission to the target speed range, while if the answer is YES then control is passed to enter next the IS TIMER ONE ON? decision block. This block is to check, in the case of a proposed upshift of the transmission by more than one shift stage together, being performed in the gradual step by step upshifting of the transmission, if a predetermined time has elapsed for one step upshifting, as will be explained later.

In the IS TIMER ONE ON? decision block, the central processing unit 39 decides whether or not the first timer is in the ON state, and if the answer is YES then control is passed to the point X in FIG. 7a, so as to enter next the block ALTER TARGET SPEED STAGE TO ACTUAL CURRENT SPEED STAGE; while if the answer is NO then control is passed to enter next the ALTER TARGET SPEED STAGE TO ONE ABOVE ACTUAL CURRENT SPEED STAGE block.

In the ALTER TARGET SPEED STAGE TO ACTUAL CURRENT SPEED STAGE block, the central processing unit or CPU 39 sets the desired or target speed stage to be equal to the speed stage in which the transmission in fact is currently functioning, and then control is passed to enter next the OUTPUT OF TRANSMISSION SHIFT CONTROL SIGNAL block.

On the other hand, in the ALTER TARGET SPEED STAGE TO ONE ABOVE ACTUAL CURRENT SPEED STAGE block, the central processing unit 39 sets the desired or target speed stage to be only one speed stage higher than the speed stage in which the transmission is in fact currently already functioning, even though the proper desired or target transmission speed stage at this time, as read out from the read only memory or ROM of the memory device 45 according to the tables shown in FIGS. 3, 4, and 5, may in fact be two speed stages or more higher than the speed stage in which the transmission is currently functioning.

Then control passes to enter next the TURN TIMER ONE ON block. In the TURN TIMER ONE ON block, the central processing unit 39 turns the first timer, already mentioned, to the ON state or mode, so that said first timer starts to measure a certain predetermined first time interval before going to the OFF state or mode again. Then control is passed to the point Z in FIG. 7a, so as to enter next the block OUTPUT OF TRANSMISSION SHIFT CONTROL SIGNAL and so as to set the transmission to the target speed stage, which as mentioned above is now exactly one speed stage higher than the current speed stage.

In the SHIFT DOWN? decision block, which as explained above is proceeded to from the SHIFT UP? decision block, the central processing unit 39 decides whether or not a shift down of the transmission is being called for; i.e. whether or not the desired or target transmission speed stage is lower than the speed stage in which the transmission in fact is already currently functioning, and if the answer is YES then control is passed to enter next the IS THROTTLE OPENING GREATER THAN A2? decision block, while if the answer is NO then control is passed to the point Z in FIG. 7, so as to enter next the block OUTPUT OF TRANSMISSION SHIFT CONTROL SIGNAL and so as to set the transmission to the target speed stage, which in fact here is obviously the same as the currently engaged speed stage.

In the IS THROTTLE OPENING GREATER THAN A2? decision block, the central processing unit 39 decides whether or not the current value of throttle opening, as indicated by the throttle opening amount sensor 40, is greater than a predetermined value A2, or not, and if the answer is NO then control is passed to the block CHANGE OF TRANSMISSION RANGE?, to be explained later; while if the answer is YES then control is passed to enter next the IS TIMER TWO ON? decision block. This block is to check, in the case of a proposed downshift of the transmission by more than one shift stage together being performed in the gradual step by step downshifting of the transmission, if a second predetermined time has elapsed for one step downshifting, as explained later.

In the IS TIMER TWO ON? decision block, the central processing unit 39 decides whether or not the second timer is in the ON state, and if the answer is YES then control is passed to the point X in FIG. 7a, so as to enter next the block ALTER TARGET SPEED STAGE TO ACTUAL CURRENT SPEED STAGE; while if the answer is NO then control is passed to enter next the first ALTER TARGET SPEED STAGE TO ONE BELOW ACTUAL CURRENT SPEED STAGE block. Thus it will be noted, that in this second preferred embodiment, in contrast to the first preferred embodiment whose flowchart is shown in FIG. 6, the intervals over which multiple upshifts are stepped or spaced are in general different from the intervals over which multipled downshifts are stepped or spaced, since the upshift interval is the predetermined first time interval or the characteristic time interval of the first timer, and the downshift interval is the predetermined second time interval or the characteristic time interval of the second timer, which is in general different.

In the first ALTER TARGET SPEED STAGE TO ONE BELOW ACTUAL CURRENT SPEED STAGE block, the central processing unit 39 sets the desired or target speed stage to be only one speed stage lower than the speed stage in which the transmission is in fact currently already functioning, even though the proper desired or target transmission speed stage at this time, as read out from the read only memory or ROM of the memory device 45 according to the tables shown in FIGS. 3, 4, and 5, may in fact be two speed stages or more lower than the speed stage in which the transmission is currently functioning. Then control passes to enter next the TURN TIMER TWO ON block.

In the TURN TIMER TWO ON block, the central processing unit 39 turns the second timer, already mentioned, to the ON state, so that said second timer starts to measure the previously mentioned predetermined second time interval before going to the OFF state again. Then control is passed to the point Z in FIG. 7a, so as to enter next the block OUTPUT OF TRANSMISSION SHIFT CONTROL SIGNAL and so as to set the transmission to the target speed stage, which as mentioned above is now exactly one speed stage lower than the current speed stage.

In the CHANGE OF TRANSMISSION RANGE? decision block, which as mentioned above is proceeded to when the system is in a shift down situation and the throttle opening is not greater than the second predetermined value A2, the central processing unit 39 makes a decision as to whether the shift down required condition has occurred due to a recent manual change of the transmission range currently selected by the driver of the vehicle, as determined from the signal from the manual range selector position sensor 43. If the answer is NO, then control is passed to the point Z in FIG. 7a, so as to enter next the block OUTPUT OF TRANSMISSION SHIFT CONTROL SIGNAL and so as immediately to set the transmission to the target speed stage, irrelevant of whether only one downshift is required, or whether several downshifts are required together; while, if the answer is YES, then control is passed so as to enter next the IS TIMER THREE ON? decision block. This block is to check, when the throttle opening is less than the above mentioned predetermined second value, in the case of a downshift required condition which arises due to a manual change of the transmission range currently selected by the driver of the vehicle which requires a downshift by two or more speed stages, if a third predetermined time has elapsed for one step downshifting, as explained later.

In the IS TIMER THREE ON? decision block, the central processing unit 39 decides whether or not the third timer is in the ON state, and if the answer is YES then control is passed to the point X in FIG. 7a, so as to enter next the block ALTER TARGET SPEED STAGE TO ACTUAL CURRENT SPEED STAGE; while if the answer is NO then control is passed to enter next the second ALTER TARGET SPEED STAGE TO ONE BELOW ACTUAL CURRENT SPEED STAGE block. Thus it will be noted, that in this second preferred embodiment, in contrast to the first preferred embodiment whose flowchart is shown in FIG. 6, the intervals over which multiple downshifts are stepped or spaced in general vary, according as the throttle opening is greater or less than the second predetermined value, since the time interval used when the throttle opening is greater than the second predetermined value is the predetermined second time interval or the characteristic time interval of the second timer, and the time interval used when the throttle opening is less than the second predetermined value is the predetermined third time interval or the characteristic time interval of the third timer, which is in general different.

In the second ALTER TARGET SPEED STAGE TO ONE BELOW ACTUAL CURRENT SPEED STAGE block, exactly as in the previous case, the central processing unit 39 sets the desired or target speed stage to be only one speed stage lower than the speed stage in which the transmission is in fact currently already functioning, even though the proper desired or target transmission speed stage at this time, as read out from the read only memory or ROM of the memory device 45 according to the tables shown in FIGS. 3, 4, and 5, may in fact be two speed stages or more lower than the speed stage in which the transmission is currently functioning. Then control passes to enter next the TURN TIMER THREE ON block.

In the TURN TIMER THREE ON block, the central processing unit 39 turns the third timer, already mentioned, to the ON state, so that said third timer starts to measure the previously mentioned predetermined third time interval before going to the OFF state again. Then control is passed to the point Z in FIG. 7a, so as to enter next the block OUTPUT OF TRANSMISSION SHIFT CONTROL SIGNAL and so as to set the transmission to the target speed stage, which as mentioned above is now exactly one speed stage lower than the current speed stage.

Thus, it will be seen that the overall effect of the operation of the second preferred embodiment of the transmission control device according to the present invention shown above, according to the second preferred embodiment of the transmission control method according to the present invention, is that, when the target transmission speed stage comes to differ by only one speed stage step from the actual or current speed stage which is being provided by the gear transmission mechanism, then the gear transmission mechanism is set forthwith to said target speed stage, i.e. upshifting or downshifting by one speed stage is performed immediately. On the other hand, when the target transmission speed stage comes to differ by more than one speed stage step upward relative to the actual or current speed stage which is being provided by the gear transmission mechanism, then the gear transmission mechanism is shifted up by one speed stage step at a time, said upshifts being separated from one another in time by a first predetermined time interval which is substantially equal to the characteristic time interval of the first timer, provided that throttle opening is less than the first predetermined value A1; but if throttle opening is greater than said first predetermined value A1, then according to this second preferred embodiment, in a similar fashion to the first preferred embodiment, it is deemed that step by step upshifting is not required in this case, since the danger of transmission torque shock occurring during multiple upshifting is not nearly so great in the case of higher throttle openings.

Further, when the target transmission speed stage comes to differ by more than one speed stage step downward relative to the actual or current speed stage which is being provided by the gear transmission mechanism, then the gear transmission mechanism is shifted down by one speed stage step at a time, said downshifts being separated from one another in time by a second predetermined time interval which is substantially equal to the characteristic time interval of the second timer, which of course is generally different from the first predetermined time interval which is substantially equal to the characteristic time interval of the first timer, provided that throttle opening is greater than the second predetermined value A2; but, if throttle opening is less than said second predetermined value A2, then according to the particular operation of this second preferred embodiment first a check is made as to whether the shift down required condition has occurred due to a manual change of the transmission range currently selected by the driver of the vehicle. If not, then in a similar fashion to the first preferred embodiment it is deemed that step by step downshifting is not required in this case, since the danger of transmission torque shock and possible slippage occurring during multiple downshifting is not nearly so great in the case of lower throttle openings, and since in these particular operational conditions it is likely that a good degree of engine braking is desirable, such as will be attained by a multiple simultaneous downshift. On the other hand, if the shift down required condition has in fact occurred due to a manual change of the transmission range currently selected by the driver of the vehicle, then the gear transmission mechanism is shifted down by one speed stage step at a time, said downshifts being separated from one another in time by a third predetermined time interval which is substantially equal to the characteristic time interval of the third timer. The reason for doing this is that if the shift down required condition has in fact occurred due to a manual change of the transmission range currently selected by the driver of the vehicle then a multiple simultaneous downshift of the gear transmission mechanism might cause overrevving of the internal combustion engine of the vehicle, irrelevant of course of the fact that the throttle opening is not greater than the second predetermined value A2; and therefore downshifting is made one step at a time at intervals determined by the third predetermined time interval which is substantially equal to the characteristic time interval of the third timer, so as to obtain good and smooth engine braking in this range down change situation.

Particularly in the case of the second preferred embodiment shown, the predetermined time interval between repeated downshifts, when they occur, is not in general the same as the predetermined time interval between repeated upshifts. This is because two timers are provided, i.e. the first and the second timer, and the characteristic time interval of the first timer is used in the case of upshifting, while the characteristic time interval of the second timer, which in general of course is different, is used in the case of downshifting; but this is not essential to the present invention, but is a particular feature of the second preferred embodiment shown. Further, although step by step upshifting in the shown second preferred embodiment is dispensed with when the throttle opening is less than the first predetermined value A1, and similarly although step by step downshifting in the shown second preferred embodiment is dispensed with when the throttle opening is greater than the second predetermined value A2, except in the case of change of transmission range, these features are not essential to the present invention, but are merely features of the particular second preferred embodiment shown. Yet further, the step by step downshifting at time intervals determined by the characteristic time interval of the third timer, in a change down of transmission range situation with throttle opening less than the second predetermined value A2, is again not essential to the present invention, but is a feature of the shown second preferred embodiment.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although throttle opening has been used as a parameter indicative of engine load, some other parameter could be used, such as for example intake manifold depression. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE

| Shift position | 11 clutch | 12 clutch | 14 brake | 16 brake | 20 brake | (one way) 15 clutch | 21 clutch |
|---|---|---|---|---|---|---|---|
| R | X | O | X | X | O | X | X |
| D 3 | O | O | X | O | X | X | X |
| 2 | O | X | X | O | X | H | X |
| 1 | O | X | X | X | X | X | H |
| 2 2 | O | X | O | O | X | H | X |
| 1 | O | X | X | X | X | X | H |
| L 1 | O | X | X | X | O | X | H |

What is claimed is:

1. For an automatic transmission for a road vehicle with an engine, comprising a gear transmission mechanism, said gear transmission mechanism comprising a plurality of hydraulic fluid pressure activated friction engaging mechanisms and providing at least three forward speed stages according to selective supplying of actuating hydraulic fluid pressures to said friction engaging mechanisms:

a transmission control device, comprising:
(a) a speed sensor for detecting the current value of road speed and a load sensor for detecting the current value of engine load;
(b) an electrically actuated hydraulic fluid pressure control device which according to selective supplying of actuating electrical energy thereto provides said selective supplying of actuating hydraulic fluid pressures to said friction engaging mechanisms so as to engage any one of said at least three forward speed stages of said gear transmission mechanism and to provide an actual speed stage;
and
(c) an electronic control system, which repetitively receives from said speed sensor a signal representative of the current value of road speed and from said load sensor a signal representative of the current value of engine load, then based on these signals determines a target speed stage of said gear transmission mechanism, then determines a decided upon speed stage of said gear transmission mechanism, and then selectively supplies actuating electrical energy to said electrically actuated hydraulic fluid pressure control device to engage said decided upon speed stage of said gear transmission mechanism; said decided upon speed stage being determined so as to cause, when said actual speed stage and said target speed stage of said gear transmission mechanism differ by less than two speed stage steps, immediate shifting of the actual speed stage which is provided by the gear transmission mechanism to said target speed stage of said gear transmission mechanism; and said decided upon speed stage being also determined so as to cause, when said actual speed stage of said gear transmission mechanism and said target speed stage of said gear transmission mechanism differ by two or more speed stage steps, at least sometimes selectively shifting of said actual speed stage of said gear transmission mechanism which is provided by said gear transmission mechanism by steps of one speed stage at a time to said target speed stage of said gear transmission mechanism, said shifts by steps being separated in time by at least a predetermined time interval.

2. A transmission control device according to claim 1, wherein said electronic control system, when said actual speed stage of said gear transmission mechanism and said target speed stage of said gear transmission mechanism differ by two or more speed stage steps and said target speed stage of said gear transmission mechanism is a higher speed stage than said actual speed stage of said gear transmission mechanism, at least sometimes upshifts said actual speed stage of said gear transmission mechanism which is provided by said gear transmission mechanism by upward steps of one speed stage at a time to said target speed stage of said gear transmission mechanism, said upshifts by steps being separated in time by at least a predetermined first time interval.

3. A transmission control device according to claim 1, wherein said electronic control system, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, at least sometimes downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval.

4. A transmission control device according to claim 2, wherein said electronic control system, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, at least sometimes downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval.

5. A transmission control device according to claim 4, wherein said first predetermined time interval is substantially equal to said second predetermined time interval.

6. A transmission control device according to claim 4, wherein said first predetermined time interval is substantially different from said second predetermined time interval.

7. A transmission control device according to claim 1, wherein said electronic control system, when said actual speed stage of said gear transmission mechanism and said target speed stage of said gear transmission mechanism differ by two or more speed stage steps and said target speed stage of said gear transmission mechanism is a higher speed stage than said actual speed stage of said gear transmission mechanism, if and only if the current value of said signal from said engine load sensor is indicative of an engine load lower than a first predetermined value, upshifts said actual speed stage of said gear transmission mechanism which is provided by said gear transmission mechanism by upward steps of one speed stage at a time to said target speed stage of said gear transmission mechanism, said upshifts by steps being separated in time by at least a predetermined first time interval; but otherwise, if the current value of said signal from said engine load sensor is indicative of an engine load higher than said first predetermined value, immediately upshifts the actual speed stage which is provided by the gear transmission mechanism to said target speed stage of said gear transmission mechanism.

8. A transmission control device according to claim 1, wherein said electronic control system, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, immediately downshifts the actual speed stage which is provided by the gear transmission mechanism to said target speed stage of said gear transmission mechanism.

9. A transmission control device according to claim 7, wherein said electronic control system, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, immediately downshifts the actual speed stage which is provided by the gear transmission mechanism to said target speed stage of said gear transmission mechanism.

10. A transmission control device according to claim 9, wherein said first predetermined time interval is substantially equal to said second predetermined time interval.

11. A transmission control device according to claim 9, wherein said first predetermined time interval is substantially different from said second predetermined time interval.

12. A transmission control device according to claim 1, wherein said electronic control system, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, in the case that a recent change of transmission speed range has not occurred, immediately downshifts the actual speed stage which is provided by the gear transmisson mechanism to said target speed stage of said gear transmission mechanism; but otherwise, in the case that a recent change of transmission speed range has occurred, downshifts said actual speed stage of said gear transmission mechanism which is provided by said gear transmission mechanism by downward steps of one speed stage at a time to said target speed stage of said gear transmission mechanism, said downshifts by steps being separated in time by at least a predetermined third time interval.

13. A transmission control device according to claim 12, wherein said electronic control system, when said actual speed stage of said gear transmission mechanism and said target speed stage of said gear transmission mechanism differ by two or more speed stage steps and said target speed stage of said gear transmission mechanism is a higher speed stage than said actual speed stage of said gear transmission mechanism, if and only if the current value of said signal from said engine load sensor is indicative of an engine load lower than a first predetermined value, upshifts said actual speed stage of said gear transmission mechanism which is provided by said gear transmission mechanism by upward steps of one speed stage at a time to said target speed stage of said gear transmission mechanism, said upshifts by steps being separated in time by at least a predetermined first time interval; but otherwise, if the current value of said signal from said engine load sensor is indicative of an engine load higher than said first predetermined value, immediately upshifts the actual speed stage which is provided by the gear transmission mechanism to said target speed stage of said gear transmission mechanism.

14. A transmission control device according to claim 12, wherein said third predetermined time interval is substantially different from said second predetermined time interval.

15. A transmission control device according to claim 13, wherein said first predetermined time interval, said second predetermined time interval, and said third predetermined time interval are all substantially different from one another.

16. For an automatic transmission for a road vehicle with an engine, comprising a gear transmission mechanism, said gear transmission mechanism comprising a plurality of hydraulic fluid pressure activated friction engaging mechanisms and providing at least three forward speed stages according to selective supplying of actuating hydraulic fluid pressures to said friction engaging mechanisms;
 a method of controlling said automatic transmission, comprising repetitively performing in the specified order the steps of:
 (a) receiving into an electronic control system from a speed sensor which detects the current value of road speed a signal representative of said current value of road speed and from a load sensor which detects the current value of engine load a signal representative of the current value of engine load;
 (b) determining by said electronic control system based on these signals a target speed stage of said gear transmission mechanism;
 (c) determining by said electronic control system a decided upon speed stage of said gear transmission mechanism;
and
 (d) selectively supplying by said electronic control system actuating electrical energy to an electrically actuated hydraulic fluid pressure control device which can provide said selective supplying of actuating hydraulic fluid pressures to said friction engaging mechanisms so as to engage any decided upon one of said at least three forward speed stages of said gear transmission mechanism according to said selective supplying of actuating electrical energy thereto, so as to engage said decided upon speed stage of said gear transmission mechanism and to provide an actual speed stage;
 said decided upon speed stage being determined so as to cause, when said actual speed stage of said gear transmission mechanism and said target speed stage of said gear transmission mechanism differ by less than two speed stage steps, immediate shifting of the actual speed stage which is provided by the gear transmission mechanism to said target speed stage of said gear transmission mechanism; and said decided upon speed stage being also determined so as to cause, when said actual speed stage of said gear transmission mechanism and said target speed stage of said gear transmission mechanism differ by two or more speed stage steps, at least sometimes shifting of said actual speed stage which is provided by said gear transmission mechanism by steps of one speed stage at a time to said target speed stage of said gear transmission mechanism, said shifts by steps being separated in time by at least a predetermined time interval.

17. A method of controlling an automatic transmission according to claim 16, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a higher speed stage than said actual speed stage of said gear transmission mechanism, at least sometimes upshifting of said actual speed stage of said gear trnsmission mechanism which is provided by said gear transmission mechanism by upward steps of one speed stage at a time to said target speed stage of said gear transmission mechanism, said upshifts by steps being separated in time by at least a predetermined first time interval.

18. A method of controlling an automatic transmission according to claim 16, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, at least sometimes downshifting of said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval.

19. A method of controlling an automatic transmission according to claim 17, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, at least sometimes downshifting of said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval.

20. A method of controlling an automatic transmission according to claim 19, wherein said first predetermined time interval is substantially equal to said second predetermined time interval.

21. A method of controlling an automatic transmission according to claim 19, wherein said first predetermined time interval is substantially different from said second predetermined time interval.

22. A method of controlling an automatic transmission according to claim 16, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a higher speed stage than said actual speed stage of said gear transmission mechanism, if and only if the current value of said signal from said engine load sensor is indicative of an engine load lower than a first predetermined value, upshifting of said actual speed stage of said gear transmission mechanism which is provided by said gear transmission mechanism by upward steps of one speed stage at a time to said target speed stage of said gear transmission mechanism, said upshifts by steps being separated in time by at least a predetermined first time interval; but otherwise, if the current value of said signal from said engine load sensor is indicative of an engine load higher than said first predetermined value, immediate upshifting of the actual speed stage which is provided by the gear transmission mechanism to said target speed stage of said gear transmission mechanism.

23. A method of controlling an automatic transmission according to claim 16, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifting of said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, immediately downshifting of the actual speed stage which is provided by the gear transmission mechanism to said target speed stage of said gear transmission mechanism.

24. A method of controlling an automatic transmission according to claim 22, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifting of said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, immediate downshifting of the actual speed stage which is provided by the gear transmission mechanism to said target speed stage of said gear transmission mechanism.

25. A method of controlling an automatic transmission according to claim 24, wherein said first predetermined time interval is substantially equal to said second predetermined time interval.

26. A method of controlling an automatic transmission according to claim 24, wherein said first predetermined time interval is substantially different from said second predetermined time interval.

27. A method of controlling an automatic transmission according to claim 24, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a lower speed stage than said actual speed stage of said gear transmission mechanism, if and only if the current value of said signal from said engine load sensor is indicative of an engine load higher than a second predetermined value, downshifting of said actual speed stage of said gear transmission mechanism which is provided by said gear transmission mechanism by downward steps of one speed stage at a time to said target speed stage of said gear transmission mechanism, said downshifts by steps being separated in time by at least a predetermined second time interval; but otherwise, if the current value of said signal from said engine load sensor is indicative of an engine load lower than said second predetermined value, in the case that a recent change of transmission speed range has not occurred, immediate downshifting of the actual speed stage which is provided by the gear transmission mechanism to said target speed stage of said gear transmission mechanism; but otherwise, in the case that a recent change of transmission speed range has occurred, downshifting of said actual speed stage of said gear transmission mechanism which is provided by said gear transmission mechanism by downwards steps of one speed stage at a time to said target speed stage of said gear transmission mechanism, said downshifts by steps being separated in time by at least a predetermined third time interval.

28. A method of controlling an automatic transmission according to claim 27, wherein said decided upon speed stage is determined so as to cause, when said actual speed stage of said gear transmission mechanism and said target speed stage of said gear transmission mechanism differ by two or more speed stage steps and said target speed stage of said gear transmission mechanism is a higher speed stage then said actual speed stage of said gear transmission mechanism, if and only if the current value of said signal from said engine load sensor is indicative of an engine load lower than a first predetermined value, upshifting of said actual speed stage of said gear transmission mechanism which is provided by said gear transmission mechanism by upward steps of one speed stage at a time to said target speed stage of said gear transmission mechanism, said upshifts by steps being separated in time by at least a predetermined first time interval; but otherwise, if the current value of said signal from said engine load sensor is indicative of an engine load higher than said first predetermined value, immediate upshifting of the actual speed stage which is provided by the gear transmission mechanism to said target speed stage of said gear transmission mechanism.

29. A method of controlling an automatic transmission according to claim 27, wherein said third predetermined time interval is substantially different from said second predetermined time interval.

30. A method of controlling an automatic transmission according to claim 28, wherein said first predetermined time interval, said second predetermined time interval, and said third predetermined time interval are all substantially different from one another.

* * * * *